United States Patent [19]

Hisatake et al.

[11] Patent Number: 5,170,263
[45] Date of Patent: Dec. 8, 1992

[54] IMAGE PROCESSING SYSTEM

[75] Inventors: Masayuki Hisatake; Hiroshi Takayanagi, both of Kanagawa, Japan

[73] Assignee: Fuji Xerox Co., Ltd., Tokyo, Japan

[21] Appl. No.: 594,965

[22] Filed: Oct. 10, 1990

[51] Int. Cl.$^5$ .............................................. H04N 1/40
[52] U.S. Cl. ................................... 358/426; 358/448
[58] Field of Search ................... 358/426, 444, 261.1, 358/261.2, 261.3, 261.4, 262.1, 442, 443, 448, 262.2

[56] References Cited

U.S. PATENT DOCUMENTS 4,652,934 3/1987 Muroya et al. ..................... 358/426

Primary Examiner—Edward L. Coles, Sr.
Assistant Examiner—Jerome Grant, II
Attorney, Agent, or Firm—Finnegan, Henderson, Farabow, Garrett and Dunner

[57] ABSTRACT

An image processing system having data compressing means for compressing image data, data storage means for storing the output data from the data compressing means, data decompressing means for decompressing the compressed image data into the original image data and transferring the decompressed data to an image output terminal, and control means for control the respective means, whereby image data derived from an image input terminal is compressed, stored, decompressed, and transferred to the image output terminal. The image processing system is improved in that the data compressing means or the data decompressing means is provided with bypass means being inserted between the input and output terminals of the means.

31 Claims, 4 Drawing Sheets

IMAGE PROCESSING SYSTEM

BACKGROUND OF THE INVENTION

1. Field of the Invention

The present invention relates to an image processing system which is capable of synthetically processing different types of data, such as image data as electrically read, code data as prepared by a personal computer, and bit map data as developed by an outline font, and more particularly to an image processing system which enables the editing of electronic images.

2. Discussion of the Related Art

FIG. 6 is a block diagram of a conventional digital image processing system. In a digital copying machine, an image input terminal (IIT) 43 reads an image of an original document by using a CCD line sensor, and converts an analog video signal as received into a digital signal. An image processing system (IPS) unit that executes correction, editing, and the like, converts the corrected signal into a two-level signal. An image output terminal (IOT) 46 produces a halftone image as a colligation of mesh-dots by controlling the turning on and off of pixels according to the two-level data.

Attempts have been made to couple the copying machine of this type with external devices, such as personal computers (PCs) and facsimile machines (FAX), and the IOT 46 is commonly used for those external devices. To this end, a selector 45 is provided between the IOT 46 and the IIT 43, as shown in FIG. 6. The selector 45 selectively couples the PC 41, FAX 44, and the IIT 43 with the IOT 44. With this arrangement, the image processing system produces a reproduced image or copy irrespective of the type of the input image data, such as the two-level data from the external devices, e.g., the PC 41 and the FAX 44, and the gradation data from the IIT 43. Since the data output from the PC usually takes the form of code data, the system converts the code data into bit map data, and then transfers the bit map data to the IOT 46. The data from the FAX 44 likewise is decoded and transferred to the IOT 46.

In the digital copying machine of this type, the copying machine and the external devices are functionally isolated from one another. The image forming and outputting operation of the system is ineffective.

To solve the problem, there has been developed a digital copying machine with an electronic RDH (recirculating document handler). In the copying machine, facsimile machine, and printer, there is a need for an electronic RDH for their post processing.

In the conventional RDH, a set of original documents is repeatedly read by an automatic image reader, and a requested number of copies of the set of documents is produced. Therefore, when the requested number of copies is increased, the number of times the document is handled is increased, thus, increasing the likelihood that the documents will be damaged. An electronic RDH can produce the requested number of copies while reading the documents only one time. In the electronic RDH, a data storage unit is provided for storing the image data. The memory capacity of the storage unit is desirably large. For this reason, a magnetic memory device, such as a hard disk, is used. Of course, a semiconductor memory may also be used. To output a requested number of copies, a set of original documents is read one time in the presented order, and the image data is stored into the storage unit. The image data stored is repeatedly read out of the storage unit in the presented order, and transferred to the image output terminal. The image output terminal produces the requested number of copies.

Since the image data contains a tremendous amount of information, the memory capacity of the storage unit must be extremely large in order to store all of the image information of a plurality of original documents. To cope with this, the combination of a compressor and a decompressor is used to compress the data and to decompress the compressed data back into its original form. The compressor compresses the data to reduce the amount of image data that must be stored into the storage unit. The image data is read out of the storage unit and decompressed into its original form. The decompressed data is then transferred to the image output terminal.

In a magnetic memory device, such as a hard disk, an access time including a seek time and the like is approximately 1 M byte/sec. A normal signal transfer time is 10 M bytes/sec. Thus, a speed gap exists between the access time and the transfer time. To cope with the speed gap, a page buffer is provided. The compressed data from the compressor is temporarily stored in the page buffer. After the storage of the image data into the hard disk is completed, the data is read out of the hard disk into the page buffer. Then, it is input to the decompressor. The decompressed image data is then transferred to the image output terminal.

Editing commands, such as "cut and paste", masking, and "pickup and move", are difficult for the RDH to handle. The image data is read by the image reader, input to the control unit of the image processing system in real time and stored in a data storage unit. Therefore, the image data must be read out of the storage unit to be edited. Since the stored data is compressed data, positional information in a coordinate system cannot be obtained. The same is true for image data rotation. For this reason, to perform editing, the compressed data must be read out of a storage unit and decompressed. The decompressed data is developed into bit map data, and loaded into a page buffer. To this end, a page buffer for editing must be additionally provided. This leads to an increase in the cost of manufacturing.

SUMMARY OF THE INVENTION

The present invention has been made in view of the above circumstances and has an object to realize sophisticated image editing without any additional page memory.

Additional objects and advantages of the present invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, an image processing system is provided that comprises means for receiving image data and a mode of operation, means for selectively compressing the image data, the compressing means having input and output terminals, compressor bypass means, connected to the input and output terminals of the compressing means, for selectively bypassing the compressing means, a page buffer for storing the data received from the compressing means and the bypassing means, means for storing the compressed image data received from the page buffer, means for selectively decompressing the compressed image data back into its original form, an image output terminal, and control means for controlling the operation of the compressing means, the compressor bypass means, the page buffer, the storing means, and the decompressing means, based on the mode of operation.

In the image processing system of the invention, the data compressing means and/or the data decompressing means are provided with bypass means being inserted between their input and output terminals. With the provision of the bypass means, when the data compressing means is bypassed by the bypass means, the input image data is transferred to and stored in the page buffer, without compressing the image data. When the data decompressing means is bypassed, the compressed data is decompressed and returned to the page buffer. Accordingly, page editing can be performed by using the page buffer for data storage, without using an additional page buffer for image editing.

BRIEF DESCRIPTION OF THE DRAWINGS

The accompanying drawings, which are incorporated in and constitute a part of this specification illustrated embodiment of the invention and, together with the description, serve to explain the object, advantages and principles of the invention. In the drawings.

DETAILED DESCRIPTION OF THE PREFERRED EMBODIMENTS

Figure 1:
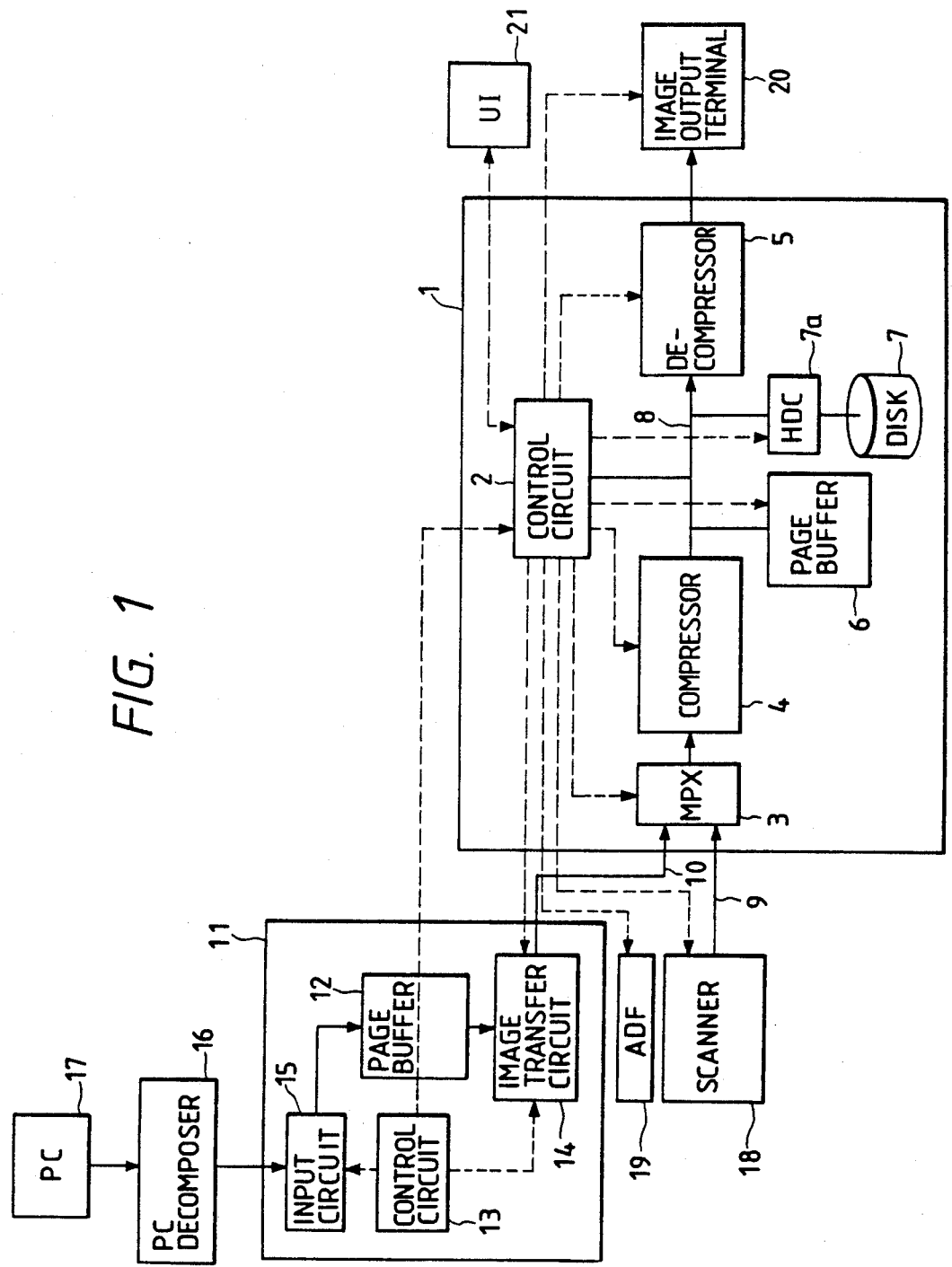
FIG. 1 is a block diagram showing an arrangement of an image processing system according to an embodiment of the present invention.

In FIG. 1, a main control unit 1 is made up of a multiplexer (MPX) 3 for selecting any of image data from an image input terminal (IIT), and image data from external devices, such as a personal computer (PC) and facsimile (FAX), a compressor 4 for compressing image data, a decompressor 5 for decompressing the compressed image data into original image data, a page buffer 6, a disk 7 having a large capacity memory, and a control circuit 2.

A scanner 18 is an image reader for reading an image on a document by using a CCD line sensor, for example. The scanner 12 executes the following items: offset and gain adjustments of the read signal; analog to digital conversion of image data; gap correction; shading correction; and the like. When it reads the document images in a color mode, the scanner executes the following items: gathering of separated color image data of three primary colors, R (red), G (green), and B (blue); offset and gain adjustments of the data image signals; analog to digital conversion of image data signal; gap correction; shading correction; END (equivalent neutral density conversion); color masking; document size detection; color change; UCR (under color removal); black generation; mesh-dot removal; edge emphasis; TRC (tone reduction control); enlargement/reduction; editing; and the like. An ADF (automatic document feeder) 19 automatically feeds original documents to the system.

An image output terminal 20, which is a laser printer, for example, reproduces a halftone image in the form of the colligation of mesh dots by controlling every pixel (picture element) by modulating a laser beam according to two-level data as generated from the image data.

A PC 17 is a personal computer. A PC decomposer 16 develops the code data from the PC 17 into bit map data. An IOCP 11 is an external device controller made up of an input circuit 15 for PC image data, page buffer 12, image transfer circuit 14, and a control circuit 13. The IOCP 11 reads the image data from the page buffer 12 and outputs the data.

A user interface (U/I) 21 includes a display, a control panel, and the like. By using the U/I 21, a user may enter various functions and editing commands, and review the contents of the present operating states of the system.

The multiplexer 3 is provided for selectively connecting an image bus 8 to a scanner image bus 9 or an IOCP image bus 10.

The compressor 4 compresses data on the basis of an adaptable predictive coding system. The compressor 4 includes many kinds of predictors which are used in a predetermined order. In the adaptable predictive coding system, the data pattern of the predictor is compared with image data every unit of pixel or pixels by the predictor. If no error occurs, "0" is assigned to the error data to execute run-length coding and the predictor is used continuously to compress the image data. On the other hand, if any error occurs, an error data corresponding to the error data is assigned and the predictor is changed to the next predictor to compare the image data. The compressed data is decompressed or expanded into the original image data by a decompressor 5 including many kinds of reverse predictors which are used in a predetermined order.

The decompressor or expander 5 is for decompressing the compressed image data into the original image data.

The page buffer 6 is capable of storing the images of documents having several pages. The page buffer temporarily stores the image data before it is written into the disk 7 and after it is read out of the disk. When the image data is not written into the disk 7 and is subjected to editing, such as alter and replace, under control of the control circuit 2, the page buffer 6 is used for temporarily storing the image data.

The disk 7 is a large capacity memory for storing a great amount image data. The writing and reading of image data to and from the disk 7 is controlled by a disk controller HDC.

A case where images of a set of original documents are read and reproduced for each sheet of the document will first be described. The image data from the scanner 18 is transferred from the scanner image bus 9 to the compressor 4, through the multiplexer 3. The compressed data is transferred to the page buffer 6, and stored into the disk 7. The compressed data is read out of the disk 7 and loaded into the page buffer 6. The image data is then transferred to the decompressor 5, and to the image output terminal 20. Alternatively, the image data may be directly transferred from the page buffer 6 or the compressor 4 to the decompressor 5, while bypassing the disk 7.

To produce a plurality of copies of those documents, the image data from the scanner 18 is compressed by the compressor 4, and stored into the disk 7. Then, the image data is repeatedly read out of the disk in the presented order a number of times corresponding to the requested number of copies. Accordingly, a plurality of copies of the documents can be produced after a single image read operation. When a plurality of copies of an original document are to be produced, the time required for outputting the plurality of copies may be reduced by decompressing the compressed data and transferring the decompressed data to the image output terminal at the same time the compressed data is stored in the disk 7. Thus the first copy may be produced without a delay associated with writing and reading the compressed data to and from the disk 7.

Figure 2:
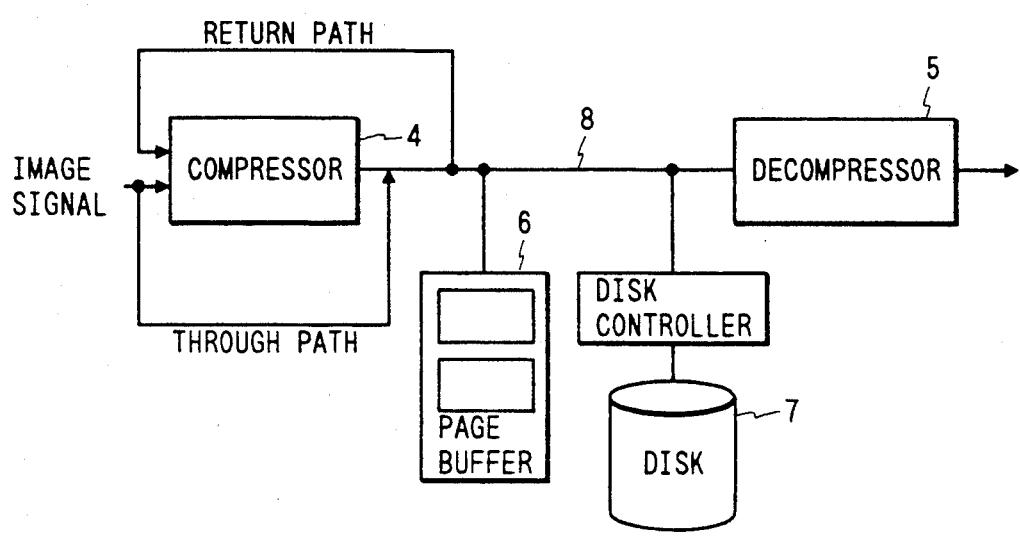
FIG. 2 is a block diagram showing a circuit arrangement where a return path and a through path are provided each being provided between the input and output of a compressor.
Figure 3:
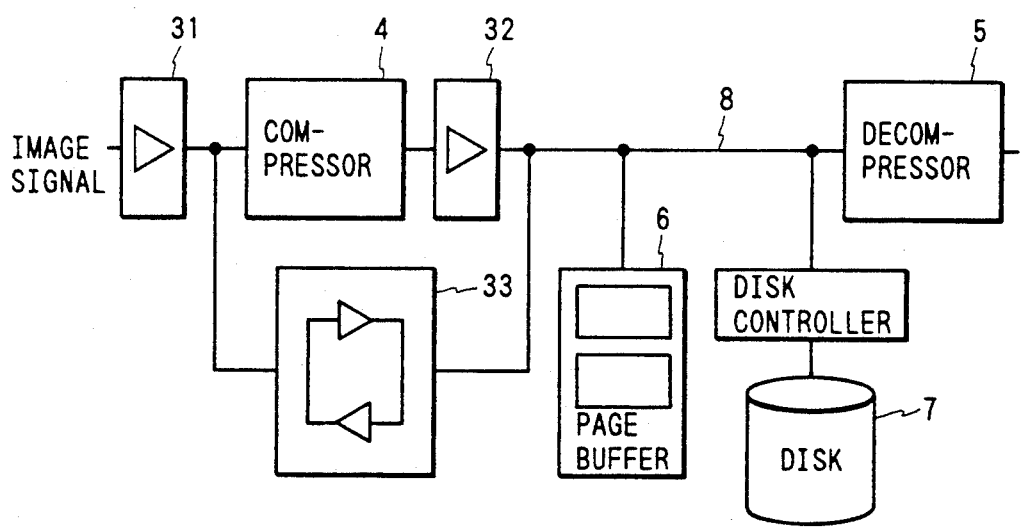
FIG. 3 is a block diagram showing a circuit arrangement wherein a bidirectional buffer is provided between the input and output of the compressor.
Figure 4:
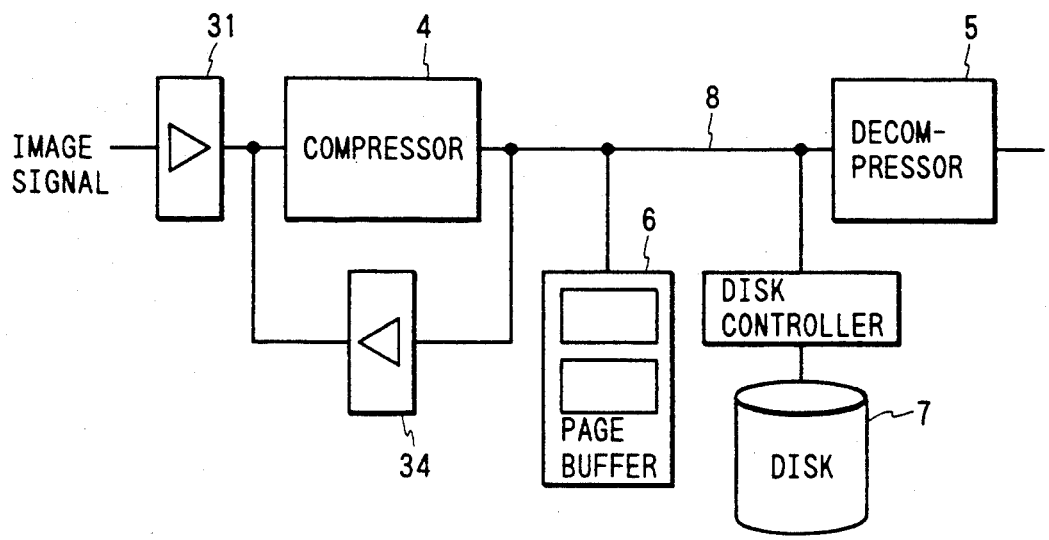
FIG. 4 is a block diagram showing a circuit arrangement wherein a tri-state buffer is provided between the input and output of the compressor.

FIG. 2 is a block diagram showing a circuit arrangement where a return path and a through path are provided each being provided between the input and output of a compressor 4. FIG. 3 is a block diagram showing a circuit arrangement where a bidirectional buffer 33 is provided between the input and output of the compressor 4. FIG. 4 is a block diagram showing a circuit arrangement where a tri-state buffer 34 is provided between the input and output of the compressor 4.

A schematic circuit arrangement for editing processes is shown in FIG. 2. In this arrangement, image data to be edited is directly loaded to the page buffer 6, through a through-path, thus bypassing the compressor 4. The image data is edited in the page buffer 6. The edited image data is input to the compressor 4, through a return path. The compressed image data is stored into a spare area of the page buffer 6 or written in an overlay fashion in an area in which data is already stored into the disk 7. With this circuit arrangement, an the electronic RDH may be used for processing edited the image data in the normal manner.

A specific arrangement of the circuit arrangement for editing processes is shown in FIG. 3, in which a buffer 33 is used for the through path and the return path. As shown, a first tri-state buffer 31 is coupled with the input of the compressor 4. A second tri-state buffer 32 is coupled with the output of the compressor 4. A bidirectional buffer 33 is connected between the input and output of the compressor 4. When receiving the image data, the first tri-state buffer 31 exhibits a low impedance at the output. When receiving no image data, the first tri-state buffer 31 exhibits a high impedance at the output, to separate the input image bus from the compressor 4. The second tri-state buffer 32 permits the output data of the compressor 4, i.e., the compressed image data, to go to the inner image bus 8 or prohibits the same from going to the bus. The bidirectional buffer 33 serves as a return path for returning the image data as compressed by the compressor 4 from the internal image bus 8 to the input of the compressor.

In a normal electronic RDH mode, the first and second tri-state buffers 31 and 32 are enabled, and the bidirectional buffer 33 is disabled to exhibit a high impedance. In this mode, the image data is input to the compressor 4, and the operation continues as already described above.

In a pre-storage edit mode, the image data to be edited must be loaded directly into the page buffer 6. To accomplish this, the first tri-state buffer 31 and the bidirectional buffer 33 are enabled, and the second tri-state buffer 32 is disabled. Now, the image data may be directly transferred to the page buffer 6 in a DMA mode under control of a DMA controller (not shown). After the image data of one page is loaded into the page buffer 6, the control circuit 2 executes an address computation and data processing to perform a page edit. At this point, it is desirable that the second tri-state buffer 32 and the bidirectional buffer 33 have been disabled.

Upon the completion of the page editing, the first tri-state 31 is disabled, and the second tri-state buffer 32 and the bidirectional buffer 33 are enabled. At the same time, the bidirectional buffer 33 is directed from the inner image bus 8 to the image input bus to form a return path. Under this condition, the edited data is returned from the page buffer 6 to the compressor 4. After the edited data is compressed by the compressor 4, the compressed data is transferred to the page buffer 6 in the DMA mode. In this mode, if the redundancy reduction efficiency is less than 1, it is required that the first DMA transfer address of the compressed data is set at the start address of the same data before it is compressed. Subsequently, data stored in the page buffer 6 is progressively stored into the disk 7.

The compressor 4 may be a compressor capable of setting up a so-called through mode in which the input image data is directly applied as intact to the inner image bus 8 under an external control (e.g., uPD72185 by NEC, Japan). When such a data compressor is used, the circuit arrangement as shown in FIG. 4 may be used. In the circuit shown in FIG. 4, tri-state buffer 34 is used in place of the bidirectional buffer 33, and the second tri-state buffer 32 is omitted.

Figure 5:
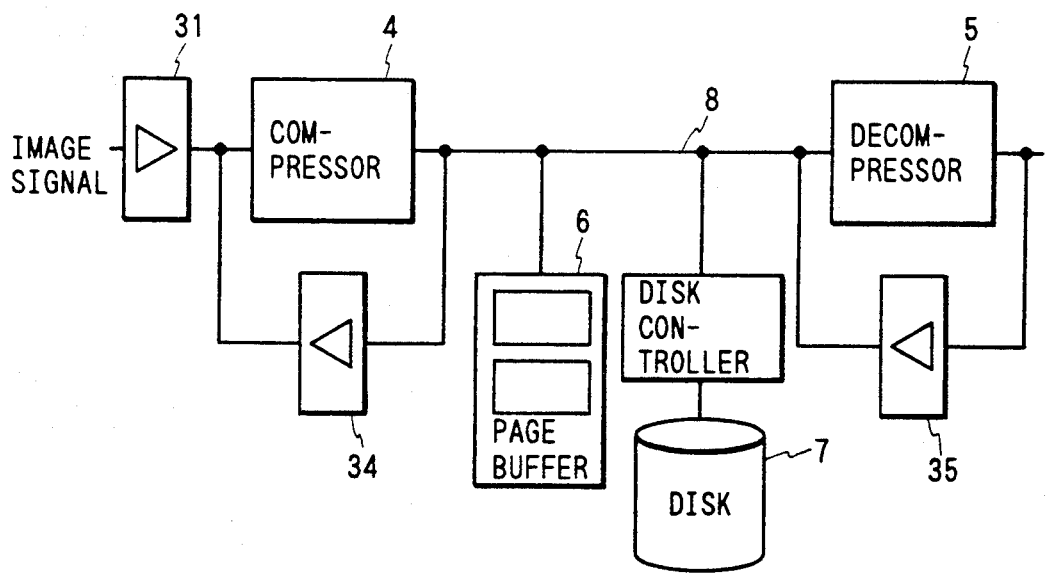
FIG. 5 is a block diagram showing another embodiment of an image processing system according to the present invention.
Figure 6:
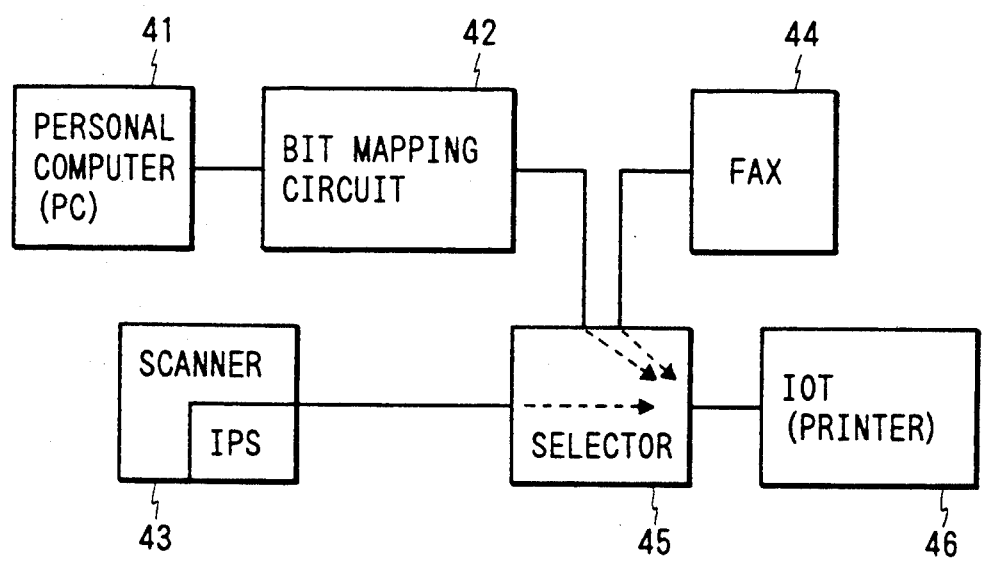
FIG. 6 is a block diagram showing a conventional image processing system.

Another embodiment of an image processing system according to the present invention is shown in FIG. 5. In this embodiment, the decompressor 5 is also provided with a tri-state buffer 35 as a return path which allows the image processing system operate in a post-storage edit mode.

In the arrangement of FIG. 5 wherein the decompressor 5 is provided with a return path via the tri-state buffer 35, the image data stored in the disk 7 is read therefrom, decompressed, and appropriately edited. In this instance, when the compressed data is successively read out of the disk 7 into the page buffer 6, and is decompressed by the decompressor 5, the tri-state buffer 35 is enabled to form a return path. The decompressed data is loaded into the page buffer 6 again. The edited data may then be compressed and stored into the disk 7 as in the case previously stated. When a decompressor capable of setting up a through mode is used, the through mode is set up, and the data may then be transferred to the image output terminal.

In reading an original document, the scanner 18 scans the original document two times. The first scan is a prescan, and the second is a main scan. After each scan, the scanner must return to the start position. The image data read during the main scan is transferred to a scanner image bus 9. However, the data read during the prescan is not transferred to the scanner image bus 9 because the data contains document size, edit marks, area read, and the like, and is processed only within the scanner 18. Accordingly, the scanner image bus 9 is idle during the time periods of the prescan and the scan return.

The image data from the PC can be processed during the time period in which the scanner 18 is operating. However, the image bus must be switched from the scanner image bus 9 to the IOCP image bus 10 by the multiplexer 3, and the processing must occur during the prescan and the scan return of the scanner 18. Further, when a plurality of copies of an original document are to be produced, the scanner 18 reads the document only once and then stops operating. During this period, however, the job code is still being executed, the data is read out of the disk 7, and the image output processing continues. The image bus is also busy during this period.

When the scanner 18 reads an image in the main scan mode or when a copy job for the plurality of copies is being executed, if the code data comes in from the PC 17, the code data is stored in the page buffer 12 in the IOCP 11 until the transfer of the code data is possible. The PC data is divided into data segments each having such a size as to be readily transferable. These data segments are then transferred during the idle time of the scanner 18.

The parallel processing of the image data is performed in the following manner:

1) The PC decomposer 16 receives the code data from the PC 17, and develops it into bit map data. The IOCP 11 stores the bit map data in the page buffer 12.

2) The control circuit 13 of the IOCP 11 sends a signal to the control circuit 2 in the main control unit 1 requesting that the control circuit 2 read the PC image data.

3) At this time, if the scanner 18 is not operating, the control circuit 2 instructs the multiplexer 3 to select the IOCP image bus 10, and reads the image data from the page buffer 12 of the IOCP 11. The image data is stored in the disk 7 via the image bus 10, multiplexer 3, compressor 4 and the page buffer 6. If the image output terminal 20 is not being used, the control circuit 2 reads the image data from the disk 7, and transfers it, through the page buffer 6 and the decompressor 5 to the image output terminal 20.

4) If the scanner 18 is operating, the control circuit allows the scanner operation to continue, and at the completion of the image read by the scanner 18, instructs the ADF 19 to change the document. Further, the control circuit sends to the IOCP 11 a signal permitting it to transfer the divided image signal. Then, the control circuit 2 sets the multiplexer 3 to the image bus 10. A first half of the image data is read out of the page buffer 12, and transferred through the IOCP image bus 10. Then, the image data is stored into the disk 7 via the multiplexer 3, compressor 4, and page buffer 6, under control of the control circuit 2. The above sequence of operations is repeated for the second half of the image data.

5) After the scanned image data has been transferred to the image output terminal 20, the control circuit 2 reads the PC image data out of the disk 7 and loads it in the page buffer 6, and then transfers it to the image output terminal 20.

In the compressor and the decompressor, the data is compressed and decompressed for predefined amounts of data. Between periods of processing, the bus is idle. Further, the bus is idle every time a predefined amount of data is processed in the reading and writing of data between the page buffer and the disk. Therefore, the parallel or concurrent data processing is possible in a manner that the image bus is commonly used by the compressor, decompressor, page buffer, disk, and the control circuit, wherein those units are given ranked priorities in using the image bus.

It should be understood that the invention is not limited to the above-mentioned embodiment, but may be changed, altered, and modified within the scope of the invention. Also when image data is read by the scanner 18, and a single hard copy is produced, the compressor 4 and the decompressor 5 are placed to the through mode, the image data, not compressed and decompressed, is processed.

As seen from the foregoing description, the compressor may be placed in the through mode or bypassed. With this feature, the input image data, not compressed, can be stored into the page buffer. Further, image editing, such as image data rotation and page editing, can be executed, without using an additional a page buffer for editing purposes. With the provision of a return path for the decompressor, the compressed data as stored may be decompressed and loaded into the page buffer.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system comprising:
   means for receiving image data and a mode of operation;
   means for selectively compressing said image data, said compressing means having input and output terminals;
   compressor bypass means, connected to said input and output terminals of said compressing means, for selectively bypassing said compressing means;
   a page buffer for storing the data received from said compressing means and said bypassing means;
   means for storing the compressed image data received from said page buffer;
   means for selectively decompressing the compressed image data back into its original form;
   an image output terminal; and
   control means for controlling the operation of said compressing means, said compressor bypass means, said page buffer, said storing means, and said decompressing means, based on said mode of operation.

2. The image processing system of claim 1, wherein said compressor bypass means includes a return path inserted between said input and output terminals of said data compressing means, said return path includes a tri-state buffer.

3. The image processing system of claim 1, wherein said receiving means receives said image data from one of a personal computer, a facsimile machine, a monochromic scanner, and a color scanner.

4. The image processing system of claim 1, wherein said mode of operation includes one of a normal mode, a through mode, and a pre-storage edit mode.

5. The image processing system of claim 4, wherein said controlling means controls the operation of said compressing means, said compressor bypass means, said page buffer, said storing means, said decompressing means, and said decompressor bypass means wherein said image data is compressed by said compressing means, stored in said page buffer, transferred to and stored in said storing means, decompressed by said decompressing means, and transferred to said image output terminal when said mode of operation is said normal mode.

6. The image processing system of claim 5, wherein said compressed image data is read from said storing means a number of times corresponding to the number of copies of said original document requested by a user.

7. The image processing system of claim 4, wherein said controlling means controls the operation of said compressing means, said compressor bypass means, said page buffer, said storing means, said decompressing means, and said decompressor bypass means wherein said image data bypasses said compressing means, stored in said page buffer for editing, returned to said compressing means where it is compressed, stored again in said page buffer, transferred to and stored in said storing means, decompressed by said decompressing means, and transferred to said image output terminal when said mode of operation is said pre-storage edit mode.

8. The image processing system of claim 7, wherein said compressed image data is read from said storing means a number of times corresponding to the number of copies of said original document requested by a user.

9. The image processing system of claim 4, wherein said controlling means controls the operation of said compressing means, said compressor bypass means, said page buffer, said storing means, said decompressing means, and said decompressor bypass means wherein said image data bypasses said compressing means, stored in said page buffer, and transferred to said image output terminal bypassing said decompressing means when said mode of operation is said through mode.

10. An image processing system comprising:
means for receiving image data and a mode of operation;
means for selectively compressing said image data, said compressing means having input and output terminals;
compressor bypass means, connected to said input and output terminals of said compressing means, for selectively bypassing said compressing means;
a page buffer for storing the data received from said compressing means and said bypassing means;
means for storing the compressed image data received from said page buffer;
means for selectively decompressing the compressed image data back into its original form, said decompressing means having input and output terminals;
decompressor bypass means, connected to said input and output terminals of said decompressing means, for selectively bypassing the decompressing means;
an image output terminal; and
control means for controlling the operation of said compressing means, said compressor bypass means, said page buffer, said storing means, said decompressing means, and said decompressor bypass means based on said mode of operation.

11. The image processing system of claim 10, wherein said receiving means receives said image data from one of a personal computer, a facsimile machine, a monochromic scanner, and a color scanner.

12. The image processing system of claim 10, wherein said decompressor bypass means includes a return path inserted between said input and output terminals of said data decompressing means, said return path including a tri-state buffer.

13. The image processing system of claim 10, wherein said mode of operation includes one of a normal mode, a through mode, a pre-storage edit mode, and a post-storage edit mode.

14. The image processing system of claim 10, wherein said compressor bypass means includes a return path inserted between said input and output terminals of said data compressing means, said return path includes a tri-state buffer.

15. The image processing system of claim 14, wherein said controlling means controls the operation of said compressing means, said compressor bypass means, said page buffer, said storing means, said decompressing means, and said decompressor bypass means wherein said image data bypasses said compressing means, stored in said page buffer, and transferred to said image output terminal bypassing said decompressing means when said mode of operation is said through mode.

16. The image processing system of claim 14, wherein said controlling means controls the operation of said compressing means, said compressor bypass means, said page buffer, said storing means, said decompressing means, and said decompressor bypass means wherein said image data is compressed by said compressing means, stored in said page buffer, transferred to and stored in said storing means, decompressed by said decompressing means, transferred to and stored in page buffer where it is edited, and transferred to said image output terminal when said mode of operation is said post-storage edit mode.

17. The image processing system of claim 14, wherein said controlling means controls the operation of said compressing means, said compressor bypass means, said page buffer, said storing means, said decompressing means, and said decompressor bypass means wherein said image data is compressed by said compressing means, stored in said page buffer, transferred to and stored in said storing means, decompressed by said decompressing means, and transferred to said image output terminal when said mode of operation is said normal mode.

18. The image processing system of claim 17, wherein said compressed image data is read from said storing means a number of times corresponding to the number of copies of said original document requested by a user.

19. The image processing system of claim 14, wherein said controlling means controls the operation of said compressing means, said compressor bypass means, said page buffer, said storing means, said decompressing means, and said decompressor bypass means wherein said image data bypasses said compressing means, stored in said page buffer for editing, returned to said compressing means where it is compressed, stored again in said page buffer, transferred to and stored in said storing means, decompressed by said decompressing means, and transferred to said image output terminal when said mode of operation is said pre-storage edit mode.

20. The image processing system of claim 19, wherein said compressed image data is read from said storing means a number of times corresponding to the number of copies of said original document requested by a user.

21. An image processing system comprising:
means for receiving image data and a mode of operation;
means for compressing said image data, said compressing means having input and output terminals;
compressor bypass means, connected to said input and output terminals of said compressing means, for selectively bypassing said compressing means;
a page buffer for storing the data received from said compressing means and said bypassing means;
means for storing the compressed image data received from said page buffer;
means for decompressing the compressed image data back into its original form, said decompressing means having input and output terminals;
decompressor bypass means, connected to said input and output terminals of said decompressing means, for selectively bypassing the decompressing means;
an image output terminal; and
control means for controlling the operation of said compressing means, said compressor bypass means, said page buffer, said storing means, said decompressing means, and said decompressor bypass means based on said mode of operation.

22. The image processing system of claim 21, wherein said compressor bypass means includes a bypass path for directly leading input image data to said page buffer, and a return path for directly leading the image data as stored in said page buffer to said compressing means.

23. The image processing system of claim 21, wherein said compressor bypass means includes a bidirectional buffer.

24. The image processing system of claim 21, wherein said decompressor bypass means includes a bidirectional buffer.

25. The image processing system of claim 21, wherein said receiving means receives said image data from one of a personal computer, a facsimile machine, a monochromic scanner, and a color scanner.

26. The image processing system of claim 21, wherein said mode of operation includes one of a normal mode, a through mode, and a pre-storage edit mode.

27. The image processing system of claim 26, wherein said controlling means controls the operation of said compressing means, said compressor bypass means, said page buffer, said storing means, said decompressing means, and said decompressor bypass means wherein said image data bypasses said compressing means, stored in said page buffer, and transferred to said image output terminal bypassing said decompressing means when said mode of operation is said through mode.

28. The image processing system of claim 26, wherein said controlling means controls the operation of said compressing means, said compressor bypass means, said page buffer, said storing means, said decompressing means, and said decompressor bypass means wherein said image data is compressed by said compressing means, stored in said page buffer, transferred to and stored in said storing means, decompressed by said decompressing means, and transferred to said image output terminal when said mode of operation is said normal mode.

29. The image processing system of claim 28, wherein said compressed image data is read from said storing means a number of times corresponding to the number of copies of said original document requested by a user.

30. The image processing system of claim 26, wherein said controlling means controls the operation of said compressing means, said compressor bypass means, said page buffer, said storing means, said decompressing means, and said decompressor bypass means wherein said image data bypasses said compressing means, stored in said page buffer for editing, returned to said compressing means where it is compressed, stored again in said page buffer, transferred to and stored in said storing means, decompressed by said decompressing means, and transferred to said image output terminal when said mode of operation is said pre-storage edit mode.

31. The image processing system of claim 30, wherein said compressed image data is read from said storing means a number of times corresponding to the number of copies of said original document requested by a user.

* * * * *